United States Patent
Mori et al.

(10) Patent No.: US 7,597,865 B2
(45) Date of Patent: Oct. 6, 2009

(54) NITROGEN OXIDE REMOVAL CATALYST SYSTEM AND NITROGEN OXIDE REMOVAL METHOD

(75) Inventors: Takayuki Mori, Sagamihara (JP); Nobuya Iwami, Sagamihara (JP); Takayuki Kumagai, Sagamihara (JP); Isamu Kanaya, Ageo (JP); Hiroki Ueno, Ageo (JP); Kiminobu Hirata, Ageo (JP)

(73) Assignees: Tokyo Roki Co., Ltd, Yokohama-Shi (JP); Nissan Diesel Motor Co., Ltd., Ageo-Shi (JP)

( * ) Notice: Subject to any disclaimer, the term of this patent is extended or adjusted under 35 U.S.C. 154(b) by 172 days.

(21) Appl. No.: 10/590,776

(22) PCT Filed: Feb. 1, 2005

(86) PCT No.: PCT/JP2005/001403

§ 371 (c)(1),
(2), (4) Date: Jun. 12, 2007

(87) PCT Pub. No.: WO2005/082494

PCT Pub. Date: Sep. 9, 2005

(65) Prior Publication Data

US 2008/0038174 A1    Feb. 14, 2008

(30) Foreign Application Priority Data

Feb. 27, 2004    (JP) .............................. 2004-055351

(51) Int. Cl.
*B01D 53/56*    (2006.01)
*B01D 53/86*    (2006.01)
*B01D 53/94*    (2006.01)
*F01N 3/10*    (2006.01)

(52) U.S. Cl. .............. 423/213.2; 423/213.5; 423/213.7; 423/239.1; 423/239.2; 422/168; 422/169; 422/170; 422/171; 422/177; 422/180; 60/299; 60/301

(58) Field of Classification Search .............. 423/213.2, 423/213.5, 213.7, 239.1, 239.2; 422/168, 422/169, 170, 171, 177, 180; 60/299, 301
See application file for complete search history.

(56) References Cited

U.S. PATENT DOCUMENTS 4,119,703 A    10/1978 Nishida et al.

(Continued)

FOREIGN PATENT DOCUMENTS

GB    1 445 239    8/1976

(Continued)

OTHER PUBLICATIONS

Chinese Office Action dated Mar. 7, 2008.

(Continued)

*Primary Examiner*—Timothy C Vanoy
(74) *Attorney, Agent, or Firm*—Finnegan, Henderson, Farabow, Garrett & Dunner LLP

(57) ABSTRACT

Provided in a catalyst system are: a first reaction part fitted with a first catalyst containing, as active constituents, at least, a complex oxide consisting of two or more oxides selected from among silica, alumina, titania, zirconia, and tungsten oxide, and a rare earth metal or transition metal (except Cu, Co, Ni, Mn, Cr, and V); and a second reaction part fitted with a second catalyst containing, as active constituents, at least, a noble metal and a silica-alumina type complex oxide.

10 Claims, 11 Drawing Sheets

U.S. PATENT DOCUMENTS

| | | | |
|---|---|---|---|
| 4,351,811 A | | 9/1982 | Matsuda et al. |
| 5,082,820 A | | 1/1992 | Mitsui et al. |
| 5,591,414 A | * | 1/1997 | Jacob et al. .................. 422/180 |
| 5,658,546 A | * | 8/1997 | Kobayashi et al. ....... 423/239.1 |
| 6,080,376 A | * | 6/2000 | Iida et al. ................. 423/239.1 |
| 2008/0095682 A1 | * | 4/2008 | Kharas et al. ............ 423/239.1 |
| 2008/0292519 A1 | * | 11/2008 | Caudle et al. ............... 423/237 |

FOREIGN PATENT DOCUMENTS

| | | |
|---|---|---|
| GB | 1445239 B | 8/1976 |
| JP | 50-53296 | 5/1975 |
| JP | 50-053296 A | 5/1975 |
| JP | 50-59282 | 5/1975 |
| JP | 50-157258 | 12/1975 |
| JP | 50-157258 A | 12/1975 |
| JP | 54-21956 | 2/1979 |
| JP | 54-021956 A | 2/1979 |
| JP | 57-127426 | 8/1982 |
| JP | 57-127426 A | 8/1982 |
| JP | 2-56250 | 2/1990 |
| JP | 20-56250 | 2/1990 |
| JP | 2-229547 | 9/1990 |
| JP | 02-229547 A | 9/1990 |
| JP | 7-275656 | 10/1995 |
| JP | 9-280012 | 10/1997 |

OTHER PUBLICATIONS

Japanese Office Action dated Jul. 8, 2008.

* cited by examiner

NITROGEN OXIDE REMOVAL CATALYST SYSTEM AND NITROGEN OXIDE REMOVAL METHOD

CROSS-REFERENCE TO RELATED APPLICATION

Note that the present application claims a priority based on Japanese Patent Application No. 2004-55351 filed on Feb. 27, 2004, which is incorporated herein by reference thereof.

1. Technical Field

The present invention relates to a nitrogen oxide removal catalyst system and a nitrogen oxide removal method.

2. Background Art

For removing (eliminating) nitrogen oxides, there have been conventionally used techniques (see Formulae (1) and (2) below) for reductively denitrating nitrogen oxides by contacting with a catalyst having, as its main components, titanium oxide and vanadium oxide in the presence of ammonia (see Japanese Patent Application No. H7-275656, for example). However, a possibility has been suggested that unreacted ammonia leaks out (slips) to cause problems such as environmental pollution, when ammonia is used in a larger amount, or when reaction conditions (such as space velocity, temperature, and the like) for reductive denitration are inappropriate. As such, a method for contacting with an alumina catalyst supporting platinum and oxidatively decomposing ammonia so as to avoid slip of ammonia has been known.

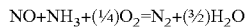   Formula (1)

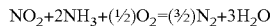   Formula (2)

DISCLOSURE OF THE INVENTION

Summary

Incidentally, there has been suggested harmfulness of vanadium included in a catalyst for reductively denitrating nitrogen oxides, thereby causing anxiousness about environmental problems due to emission of catalyst components. Usage of catalysts including harmful components is thus suggested to be problematic.

It has been also pointed out that, in case of a catalyst for oxidatively decomposing ammonia into nitrogen and water (see Formula (3)), nitrogen oxides are generated (particularly $N_2O$) at higher concentrations upon oxidation of ammonia (see Formulae (4) through (6)), thereby exhibiting possibilities of occurrence of problems such as global warming and environmental pollution.

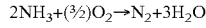   Formula (3)

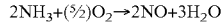   Formula (4)

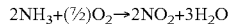   Formula (5)

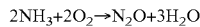   Formula (6)

The present invention has been made to solve the above problems, and it is therefore an object of the present invention to provide a nitrogen oxide removal catalyst system and a nitrogen oxide removal method, each adopting a catalyst which is free of metals that have been suggested harmful and capable of achieving removal of nitrogen oxides efficiently, and another catalyst which is capable of reducing generation of nitrogen oxides and capable of oxidatively decomposing slip ammonia into nitrogen and water effectively.

The present inventors have found that nitrogen oxides can be effectively removed when they are reductively denitrated by urea, by adopting a catalyst (hereinafter called "Ce—W—Zr oxide based catalyst") obtained by adding cerium to a tungsten oxide-zirconia type complex oxide, a catalyst (hereinafter called "Fe—Si—Al oxide based catalyst") obtained by adding iron to a silica-alumina type complex oxide, and a catalyst (hereinafter called "Ce—Ti—SO$_4$—Zr based catalyst") obtained by adding cerium and sulfur to a titania-zirconia type complex oxide.

Further, the present inventors have also found that nitrogen oxides can be more effectively removed when they are reductively denitrated by urea, by adopting a mixed catalyst of the Ce—Ti—SO$_4$—Zr based catalyst and Fe—Si—Al oxide based catalyst, as compared with cases where a catalyst such as the Ce—Ti—SO$_4$—Zr based catalyst, Fe—Si—Al oxide based catalyst, or the like is used alone.

Moreover, the present inventors have found that generation of nitrogen oxides can be reduced and ammonia can be oxidatively decomposed into nitrogen and water effectively, when ammonia is thermo-oxidatively decomposed by a catalyst (hereinafter called "Pt—Al—Si oxide based catalyst") obtained by adding platinum to a silica-alumina type complex oxide.

Furthermore, the present inventors have found that generation of nitrogen oxides can be more reduced and ammonia can be oxidatively decomposed into nitrogen and water with a better efficiency when ammonia is oxidatively decomposed by a catalyst obtained by carrying a mixed catalyst of the Ce—Ti—SO$_4$—Zr based catalyst and Fe—Si—Al oxide based catalyst on the Pt—Al—Si oxide based catalyst, as compared with a case where the Pt—Al—Si oxide based catalyst is used solely. In this way, the present inventors have attained completion of the present invention.

Namely, the nitrogen oxide removal catalyst system according to the present invention is a catalyst system comprising: a first reaction part to denitrate nitrogen oxide by reacting with ammonia, being provided with a first catalyst containing, as active constituents, at least: a complex oxide consisting of two or more oxides selected from silica, alumina, titania, zirconia, and tungsten oxide; and a rare earth metal or transition metal (except Cu, Co, Ni, Mn, Cr, and V), and a second reaction part to oxidatively decompose ammonia that has leaked from the first reaction part, being provided with a second catalyst containing, as active constituents, at least: a noble metal and a silica-alumina type complex oxide. Note that the first catalyst may further contain sulfur or phosphorus.

The first catalyst may contain, as active constituents, at least: a titania-zirconia type complex oxide; a rare earth metal or transition metal (except Cu, Co, Ni, Mn, Cr, and V); and sulfur or phosphorus; or may contain, as active constituents, at least: a tungsten oxide-zirconia type complex oxide; a rare earth metal or transition metal (except Cu, Co, Ni, Mn, Cr, and V); and sulfur or phosphorus. Further, the first catalyst may contain, as active constituents, at least, a silica-alumina type complex oxide and a rare earth metal; or may consist of a silica-alumina type complex oxide and a transition metal (except Cu, Co, Ni, Mn, Cr, and V).

Note that a composite supported on the first catalyst, wherein the composite contains, as active constituents, at least: an oxide selected from silica, alumina, titania, zirconia, and tungsten oxide; and a rare earth metal or transition metal (except Cu, Co, Ni, Mn, Cr, and V) is supported by the first catalyst. Note that the first catalyst and the composite may be different from each other in component (composition). Further, a composite containing, as active constituents, at least:

an oxide selected from silica, alumina, titania, zirconia, and tungsten oxide; and a rare earth metal or transition metal (except Cu, Co, Ni, Mn, Cr, and V) may be supported by the second catalyst. Note that the second catalyst and the composite may be different from each other in component (composition).

Further, the first catalyst or the second catalyst may be supported by a carrier substrate.

The nitrogen oxide removal catalyst system according to the present invention may further comprise, at an upstream side of the first reaction part, a third reaction part to oxidize nitrogen compounds by reacting with oxygen.

The nitrogen oxide removal method according to the present invention comprises denitrating nitrogen oxide reductively by contacting the same with a first catalyst in the presence of ammonia, the first catalyst containing, as active constituents, at least: a complex oxide comprising two or more oxides selected from silica, alumina, titania, zirconia, and tungsten oxide; and a rare earth metal or transition metal (except Cu, Co, Ni, Mn, Cr, and V) and decomposing unreacted ammonia oxidatively by contacting the same with a second catalyst, the second catalyst containing, as active constituents, at least, a noble metal and a silica-alumina type complex oxide.

EXPLANATIONS OF LETTERS OR NUMERALS

Figure 1:
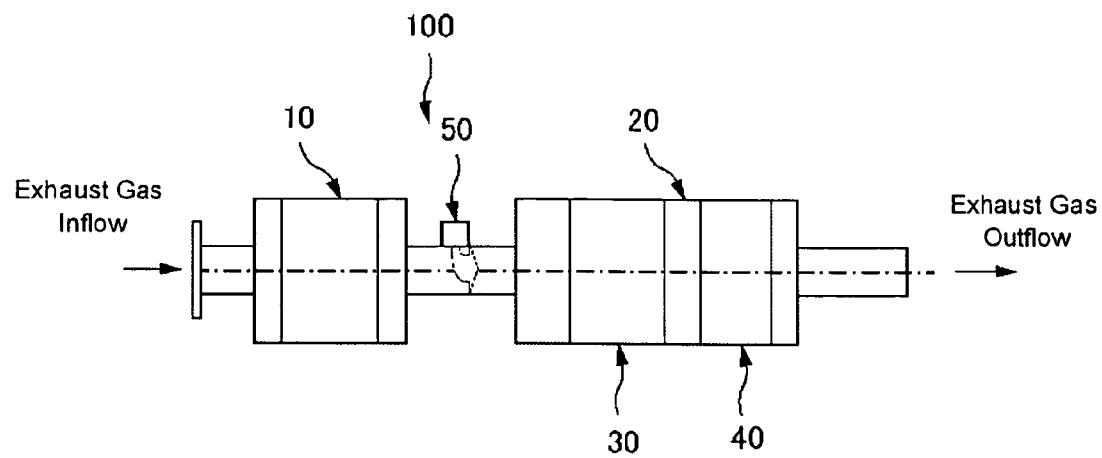
FIG. 1 is a view showing an exemplary overall constitution of an exhaust gas purification muffler according to an embodiment of the present invention.

10 nitrogen compound oxidizing/treating part
20 nitrogen oxide removal/treating part
30 first reaction part
40 second reaction part
50 denitrating/reducing agent injection part
100 catalyst system

DETAILED DESCRIPTION OF THE INVENTION

Embodiments of the present invention which has been accomplished based on the above findings will be explained in detail with references to Examples.

===Overall Constitution of Catalyst System===

The nitrogen oxide removal catalyst system (hereinafter simply called "catalyst system") according to the present invention is exemplarily used to remove nitrogen oxide within an exhaust gas generated upon combustion of fuels such as diesel, gasoline, coal, and the like. Embodiments of the catalyst system of the present invention will be explained by taking an exhaust gas purification muffler for example. FIG. 1 shows an exemplary overall constitution of the exhaust gas purification muffler according to an embodiment of the present invention. As shown in FIG. 1, the catalyst system 100 is provided with a nitrogen compound oxidizing/treating part 10, a nitrogen oxide removing/treating part 20, a denitrating/reducing agent injection part 50, among others.

The nitrogen compound oxidizing/treating part 10 is for oxidizing a nitrogen compound by reacting it with oxygen, and is provided with a nitrogen compound oxidation catalyst capable of effectively oxidizing a nitrogen compound.

The nitrogen oxide purifying/treating part 20 is for removing the nitrogen oxide discharged from the nitrogen compound oxidizing/treating part 10. The nitrogen oxide removing/treating part 20 is provided with a first reaction part 30 for reacting nitrogen oxide with ammonia to thereby denitrate the nitrogen oxide, and a second reaction part 40 for oxidatively decomposing ammonia leaked from the first reaction part. The first reaction part 30 is provided with an ammonia-aided reduction catalyst capable of reductively denitrating nitrogen oxide by ammonia effectively, and the second reaction part 40 is provided with an ammonia slip removal catalyst capable of oxidatively decomposing ammonia effectively.

The denitrating/reducing agent injection part 50 is provided for injecting a denitrating/reducing agent into the nitrogen oxide removing/treating part 20.

It should be noted that although the first reaction part 30 and the second reaction part 40 are provided in the single treating part 20 in this embodiment of the present invention, the reaction parts may also be provided in separate treating parts.

===Denitrating/Reducing Agent===

While an ammonia source such as ammonia, ammonia water (ammonia liquor), liquefied ammonia, or the like may be adopted as the denitrating/reducing agent to be injected into the nitrogen oxide removing/treating part 20 by the denitrating/reducing agent injection part 50, an ammonia precursor capable of generating ammonia in the nitrogen oxide removing/treating part 20 may also be adopted. Examples of the ammonia precursor include urea, urea water, and the like capable of generating ammonia by thermal decomposition. It is preferable to adopt urea, urea water, or the like as the denitrating/reducing agent, from environmental and other points of view.

The amount of the denitrating/reducing agent to be injected is not particularly limited insofar as being sufficient for reductively decomposing nitrogen oxide, and preferably in accordance with the due characteristics such as amounts of nitrogen oxides, removal performance of catalysts, and the like. In this way, adjusting an amount of the denitrating/reducing agent and injecting it into the nitrogen oxide removing/treating part 20, enables nitrogen oxide to be reductively decomposed effectively, thereby allowing restriction of an amount of slip ammonia.

===Ammonia-Aided Reduction Catalyst===

Next, the ammonia-aided reduction catalyst provided in the first reaction part 30 will be explained. The ammonia-aided reduction catalyst contains, as active constituents, at least: a complex oxide consisting of two or more oxides selected from silica, alumina, titania, zirconia, and tungsten oxide; and a rare earth metal or transition metal (except Cu, Co, Ni, Mn, Cr, and V). Note that the ammonia-aided reduction catalyst may consist of, at least: a complex oxide containing two or more oxides selected from silica, alumina, titania, zirconia, and tungsten oxide; and a rare earth metal or transition metal (except Cu, Co, Ni, Mn, Cr, and V). Examples of combination for the complex oxide include silica-alumina, silica-titania, silica-zirconia, silica-tungsten oxide, alumina-titania, alumina-zirconia, alumina-tungsten oxide, titania-zirconia, titania-tungsten oxide, tungsten oxide-zirconia, and the like. While complex oxides each consisting of two oxides are exemplified herein, a complex oxide may consist of three or more oxides.

Preferred forms of the complex oxide are titania-zirconia, silica-alumina, tungsten oxide-zirconia, and the like. The titania-zirconia type complex oxide is preferable, in that it is capable of restricting generation of a by-product (such as cyanic acid) upon thermal decomposition of urea, and capable of reductively decomposing nitrogen oxide effectively under a reaction condition of 230 to 500° C. The silica-alumina type complex oxide is also preferable, in that it is excellent in adsorptivity of ammonia, and particularly, it is capable of holding ammonia even under a reaction condition of 200 to 400° C. Thus, using the silica-alumina type complex oxide enables improvement of a catalytic activity performance. The tungsten oxide-zirconia type complex oxide is preferable, in that it is excellent in durability.

Note that, in case of the titania-zirconia type complex oxide, it is particularly preferable to have a molar composition ratio (Ti:Zr) between titanium and zirconium within a range of 8:2 to 2:8. In case of the silica-alumina type complex oxide, it is preferable to have a molar composition ratio (Si:Al) between silicon and aluminum within a range of 5:1 to 500:1. Further, in case of the tungsten oxide-zirconia type complex oxide, it is preferable to have a molar composition ratio (W:Zr) between tungsten oxide and zirconium within a range of 1:20 to 1:5.

Examples of rare earth metals include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and the like.

Examples of transition metals include anyone of simple substances made of first-row transition metal elements ($^{21}$Sc to $^{29}$Cu), second-row transition metal elements ($^{39}$Y to $^{47}$Ag), and third-row transition metal elements ($^{72}$Hf to $^{79}$Au), except for harmful metals such as copper (Cu), cobalt (Co), nickel (Ni), manganese (Mn), chromium (Cr), and vanadium (V).

Note that the ammonia-aided reduction catalyst may further contain sulfur or phosphorus. In this way, inclusion of sulfur or phosphorus in the ammonia-aided reduction catalyst enables nitrogen oxide to be reductively decomposed effectively. Further, the ammonia-aided reduction catalyst may contain another oxide, another rare earth metal or transition metal, or a composite containing, as active constituents, oxide and a rare earth metal or transition metal, for reductively decomposing nitrogen oxide effectively. Such an oxide is not particularly limited insofar as it is a heat-resistant oxide, and preferable examples thereof are an oxide selected from at least silica, alumina, titania, zirconia, and tungsten oxide, and a complex oxide consisting of two or more oxides selected from at least silica, alumina, titania, zirconia, and tungsten oxide. Note that the ammonia-aided reduction catalyst may be: a catalyst containing, as active constituents, a complex oxide consisting of two or more oxides selected from silica, alumina, titania, zirconia, and tungsten oxide, and a rare earth metal or transition metal (except Cu, Co, Ni, Mn, Cr, and V), supporting a composite containing, as active constituents, oxide and a rare earth metal or transition metal; or the above catalyst simply mixed with the above composite. Note that the weight ratio between the catalyst and the composite is preferably within a range of 0.2:0.8 to 0.8:0.2.

The content of the rare earth metal or the transition metal in the ammonia-aided reduction catalyst is preferably within a range of 2 wt % to 50 wt %. Further, the content of sulfur or phosphorus in the ammonia-aided reduction catalyst is preferably 10 wt % or less, and in case of the titania-zirconia type complex oxide, desirably within a range of 0.5 wt % to 10 wt %.

Application of the above described ammonia-aided reduction catalyst to the catalyst system according to the present invention enables effective removal of nitrogen oxide. Note that while the ammonia-aided reduction catalyst may be directly used, it may also be supported on a carrier substrate so as to attain removal of nitrogen oxide more effectively. For the carrier substrate, it is preferable to adopt a honeycomb substrate, a porous substrate, or the like, for example.

===Ammonia Slip Removal Catalyst===

The ammonia slip removal catalyst provided in the second reaction part 40 will be explained next. The ammonia slip removal catalyst contains, as active constituents, at least, a noble metal and a silica-alumina type complex oxide. Examples of the noble metal include gold (Au), silver (Ag), platinum group (ruthenium (Ru), rhodium (Rh), palladium (Pd), osmium (Os), iridium (Ir), and platinum (Pt)), and the like. The content of noble metal in the ammonia slip removal catalyst is preferably within a range of 0.1 wt % to 5 wt %, and particularly preferably within a range of 0.3 wt % to 3 wt %. It is particularly preferable that the molar composition ratio between silicon and aluminum (Si:Al) in the silica-alumina type complex oxide is within a range of 10:1 to 100:1.

The ammonia slip removal catalyst may contain oxide, another rare earth metal or transition metal, or a composite containing, as active constituents, oxide and a rare earth metal or transition metal, for restricting generation of nitrogen oxide and for oxidatively decomposing slip ammonia effectively. The composite may further contain sulfur, phosphorus, or the like.

Such an oxide is not particularly limited insofar as it is a heat-resistant oxide, and its preferable examples are an oxide selected from at least silica, alumina, titania, zirconia, and tungsten oxide, and a complex oxide consisting of two or more oxides selected from at least silica, alumina, titania, zirconia, and tungsten oxide, and particularly preferable is a titania-zirconia type complex oxide, a silica-alumina type complex oxide, or their mixture.

Note that the ammonia slip removal catalyst may be a catalyst containing, as active constituents, at least, a noble metal and a silica-alumina type complex oxide, supporting a composite containing, as active constituents, oxide and a rare earth metal or transition metal or such a catalyst simply mixed with such a composite. The weight ratio between the catalyst and the composite is preferably within a range of 1:1 to 1:10. Note that it is particularly preferable in this case that the molar composition ratio between silicon and aluminum (Si:Al) in the silica-alumina type complex oxide of the catalyst is within a range of 5:1 to 500:1.

The content of the rare earth metal or the transition metal in the composite is preferably within a range of 2 wt % to 50 wt %. Further, the content of sulfur or phosphorus in the composite is preferably 10 wt % or less, and preferably within a range of 0.5 wt % to 10 wt % in case of the titania-zirconia type complex oxide.

Application of the above described ammonia slip removal catalyst to the catalyst system according to the present invention enables effective restriction of nitrogen oxide generation, and effective oxidative decomposition of slip ammonia. Note that while the ammonia slip removal catalyst may be directly used, it may also be supported on a carrier substrate so as to effectively attain restriction of nitrogen oxide generation and oxidative decomposition of slip ammonia. For the carrier substrate, it is preferable to adopt a honeycomb substrate, a porous substrate, or the like, for example.

Note that the ammonia-aided reduction catalyst and ammonia slip removal catalyst can be produced by methods such as an impregnation method, kneading method, coprecipitation method, sol-gel method, and the like.

===Removal Method of Nitrogen Oxide===

The nitrogen oxide removal method according to the present invention includes steps of contacting the nitrogen oxide with an ammonia-aided reduction catalyst in the presence of ammonia to reductively denitrate nitrogen oxide, and contacting untreated ammonia with an ammonia slip removal catalyst to oxidatively decompose the unreacted ammonia. These steps enable nitrogen oxides and ammonia to be effectively removed.

Note that, in case of removal of nitrogen oxides in an exhaust gas generated upon combustion of a fuel such as diesel or coal, the space velocity of exhaust gas is preferably within a range of 5,000/h to 200,000/h, and particularly preferably within a range of 10,000/h to 50,000/h. The substance amount of ammonia is preferably within a range of 0.6 mol to 1.0 mol relative to 1 mol of nitrogen oxides, and particularly preferably within a range of 0.7 mol to 0.9 mol relative to 1 mol of nitrogen oxides.

The reaction temperature upon reductive denitration is preferably within a range of 150° C. to 500° C., particularly preferably within a range of 185° C. to 500° C. in that the ammonia-aided reduction catalyst can effectively adsorbs ammonia then, and most preferably within a range of 220° C. to 500° C. in that nitrogen oxides can be effectively removed. Note that, in case of generation of ammonia by addition of urea, the reaction temperature upon reductive denitration is preferably within a range of 170° C. to 250° C. in that ammonia can be effectively generated. Further, the reaction temperature upon oxidative decomposition is preferably within a range of 150° C. to 500° C.

EXAMPLES

The present invention will be explained specifically, based on Examples. Note that these Examples are provided only for explaining the present invention, and not to limit the scope of the present invention.

Example 1

<Production of Ce—Ti—SO$_4$—Zr Based Catalyst>

Figure 2:
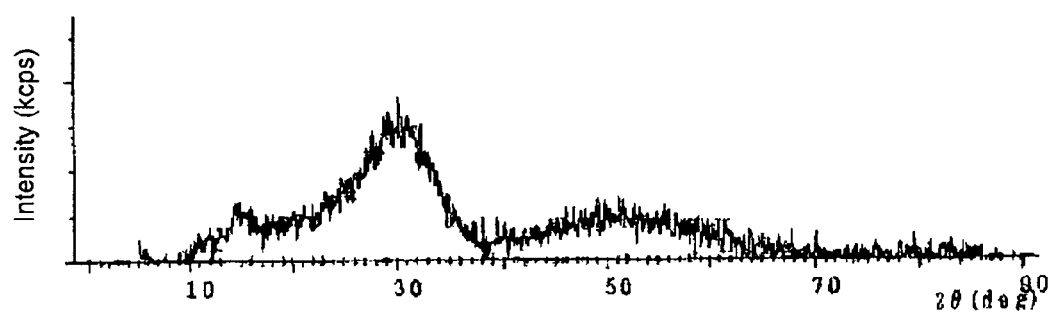
FIG. 2 is a graph of an X-ray diffractometry result of a Ce—Ti—$SO_4$—Zr based catalyst produced by Example 1.

An aqueous mixture solution of 100 g of Zr salt (zirconium sulfate), 50 g of Ti salt (titanium chloride), and 50 g of Ce salt (cerium nitrate) dissolved in 1 L of water, was prepared, followed by addition of an alkali solution (ammonia water) for neutralization, and filtration. The solution was fired at 400° C. or higher and pulverized to obtain a powder. Thereafter, it was confirmed by X-ray diffractometry that this powder was a Ce—Ti—SO$_4$—Zr based catalyst (see FIG. 2).

Example 2

<Product Ion of Fe—Si—Al Oxide Based Catalyst>

Figure 3:
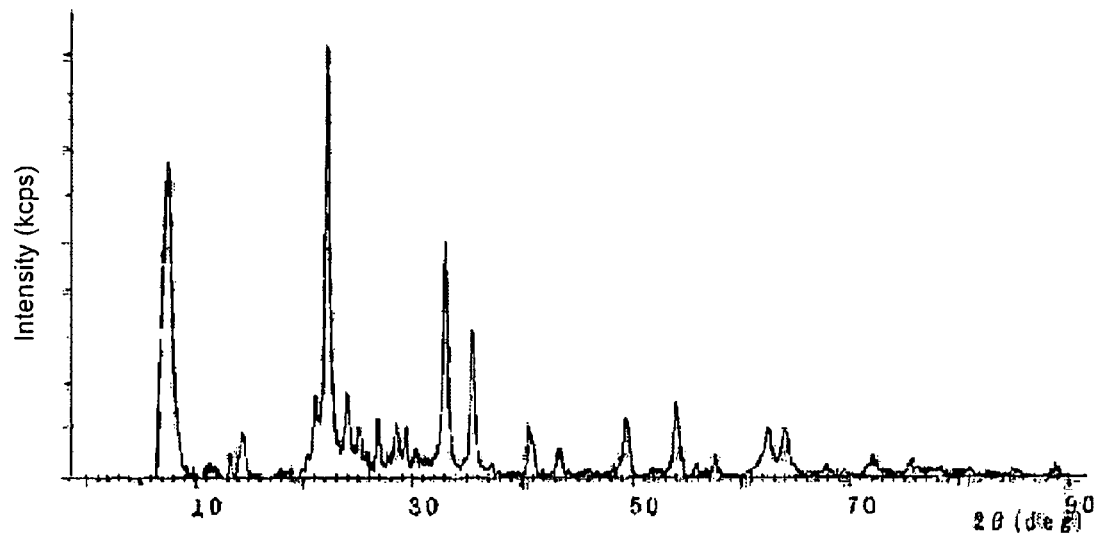
FIG. 3 is a graph of an X-ray diffractometry result of an Fe—Si—Al oxide based catalyst produced by Example 2.

An aqueous solution of iron nitrate (made by dissolving 1,000 g of iron nitrate in 500 L of water) was gradually dropped onto 1,000 g of a porous oxide made of silica-alumina (molar composition ratio=40/1) while stirring. Powdery matter obtained was dried at 120° C. was fired at 450° C. for 2 hours, thereby obtaining a powder. Thereafter, it was confirmed that this powder was an Fe—Si—Al oxide based catalyst (see FIG. 3).

Example 3

<Production of Ce—W—Zr Oxide Based Catalyst>

Figure 4:
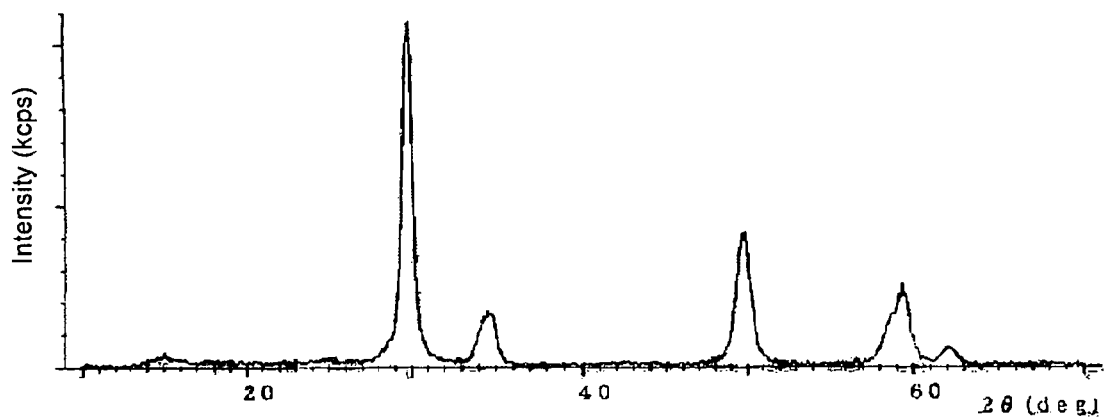
FIG. 4 is a graph of an X-ray diffractometry result of a Ce—W—Zr oxide based catalyst produced by Example 3.

An aqueous mixture solution of 100 g of Zr salt (zirconium sulfate) and 50 g of Ce salt (cerium nitrate) dissolved in 1 L of water was prepared, followed by addition of an alkali solution (ammonia water) for neutralization, and filtration. 15 g of ammonium tungstate was impregnated in the solution, which was then fired at 400° C. or higher, and pulverized to obtain a powder. Thereafter, it was confirmed that this powder was a Ce—W—Zr oxide based catalyst (see FIG. 4).

Example 4

<Production of Pt—Al—Si Oxide Based Catalyst>

Figure 5:
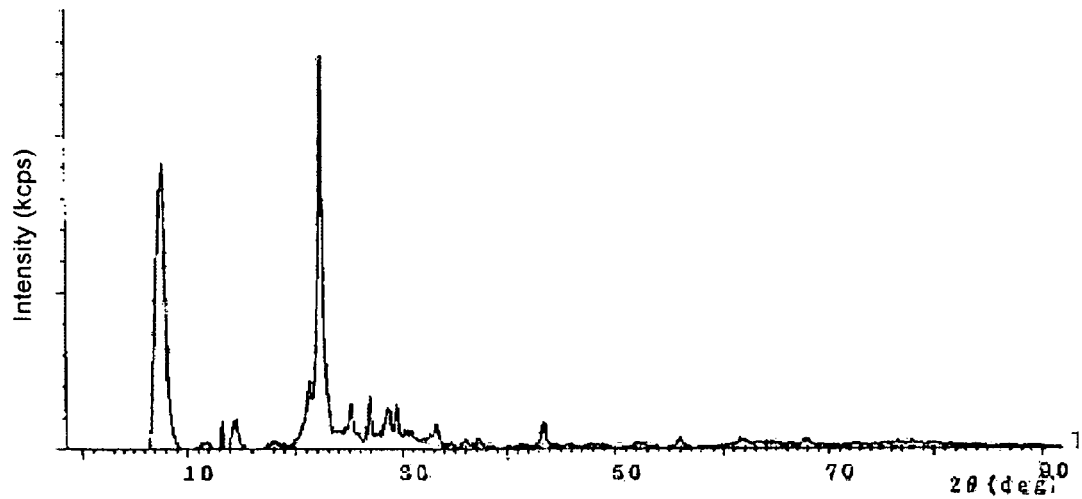
FIG. 5 is a graph of an X-ray diffractometry result of a Pt—Al—Si oxide based catalyst produced by Example 4.

An aqueous solution of organic platinum compound (a bis-ethanol ammonium platinum hydroxide solution was used in this Example) at a concentration of 5% was gradually dropped onto 1,000 g of a complex oxide made of alumina-silica, while stirring. Powdery matter obtained was dried at 120° C. and fired at 450° C. for 2 hours, thereby obtaining a powder. Thereafter, it was confirmed that this powder was a Pt—Al—Si oxide based catalyst (see FIG. 5).

Example 5

<Thermal Decomposition Reaction Test of Urea>

It is known that thermal decomposition (hydrolysis) of urea (reducing/denitrating agent) in an atmosphere of a conventional $V_2O_5$—$TiO_2$ based catalyst generates by-products in addition to ammonia. It was thus examined whether by-products are generated in case of adoption of an ammonia-aided reduction catalyst in thermal decomposition of urea.

0.1 g of the Ce—Ti—$SO_4$—Zr based catalyst powder obtained in Example 1 was impregnated with 0.2 ml of aqueous urea solution (2.5 wt %) followed by drying to prepare a matter which was then subjected to TPD (Temperature Programmed Desorption)-Mass to analyze gas components generated by thermal decomposition upon temperature rising. The temperature rising condition was set to +10° C./min. The TPD-Mass analysis was conducted under atmospheric conditions at a range of 100° C. to 300° C.

Figure 6:
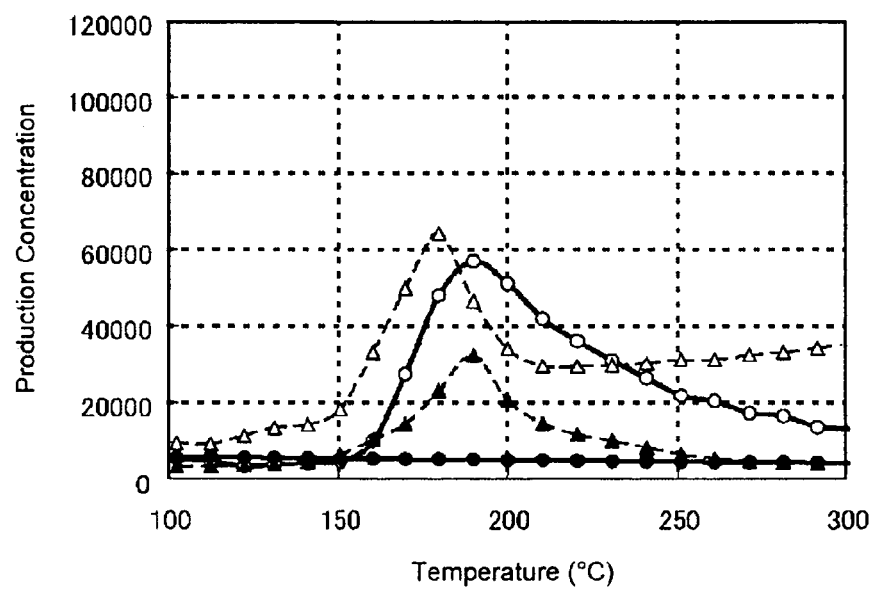
FIG. 6 is a graph of a result of examination of an effect of the Ce—Ti—$SO_4$—Zr based catalyst produced in the Example 1, on thermal decomposition of urea.

The result is shown in FIG. 6. As shown in FIG. 6, the conventional $V_2O_5$—$TiO_2$ based catalyst made ammonia (open triangle) and a by-product (black triangle) generated by thermal decomposition of urea under conditions of reaction temperatures at 150° C. to 250° C. However, the Ce—Ti—$SO_4$—Zr based catalyst proved to generate only ammonia (open circle) without generating the by-product (black circle) under any reaction temperature condition. This clarified that the ammonia-aided reduction catalyst is useful for improvement of a catalytic activity performance.

Example 6

<Denitrating Reaction Test 1>

Figure 7:
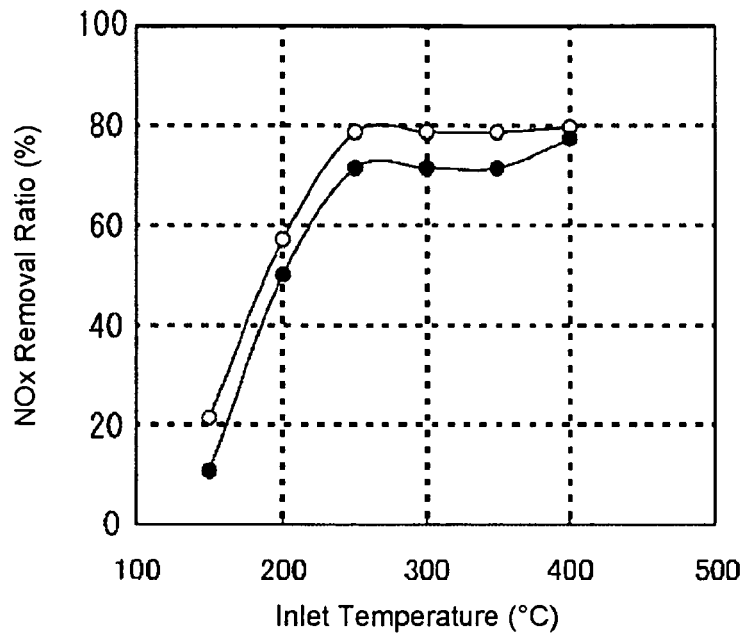
FIG. 7 is a graph of a result of a comparison with a $V_2O_5$—$TiO_2$ based catalyst (black circle) concerning a NOx removal characteristic of the Ce—Ti—$SO_4$—Zr based catalyst (open circle) obtained in the Example 1.

A denitrating reaction test was conducted under the following conditions for the Ce—Ti—$SO_4$—Zr based catalyst obtained in the Example 1. The catalyst was supported on a honeycomb carrier having a diameter of 25 mmφ and a length of 50 mm, and a reaction gas was introduced, which was made of 10% Of $O_2$, 150 ppm each of NO and $NO_2$, 5% of $H_2O$, and nitrogen for remainder, at a space velocity (SV) of 50,000/h. This was conducted at a catalyst inlet temperature at a range of 150° C. to 400° C. The similar experiment was done by using the $V_2O_5$—$TiO_2$ based catalyst as a control. The results are shown in FIG. 7. As shown in FIG. 7, the Ce—Ti—$SO_4$—Zr based catalyst (open circle) proved to be capable of removing nitrogen oxides, better than the $V_2O_5$—$TiO_2$ based catalyst (black circle)

Example 7

<Denitrating Reaction Test 2>

Figure 8:
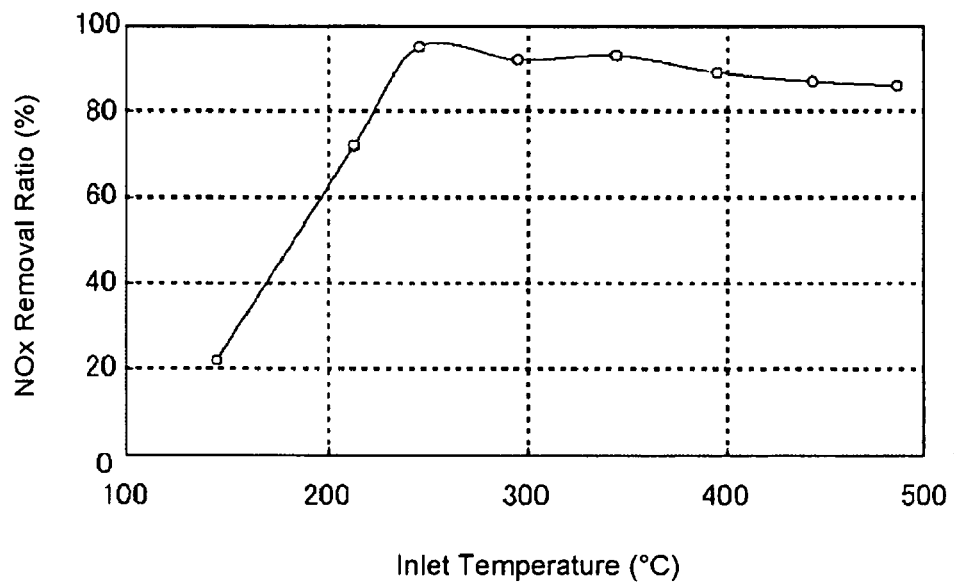
FIG. 8 is a graph of a result of examination of a NOx removal characteristic by an actual device/steady evaluation test adopting the Ce—Ti—$SO_4$—Zr based catalyst obtained in the Example 1.

To examine a removal efficacy of nitrogen oxides with respect to an SCR inlet temperature, the Ce—Ti—$SO_4$—Zr based catalyst in an SCR catalyst size of φ7.5"×7" (5 L) was mounted on an exhaust muffler of a 5 L-NA engine, and a Pt-based oxidation catalyst (Pt-alumina catalyst: produced by TOKYO ROKI Co., Ltd.) was mounted upstream of the SCR catalyst, for conducting an actual device/steady evaluation test. The result is shown in FIG. 8. As shown in FIG. 8, the Ce—Ti—$SO_4$—Zr based catalyst proved to be capable of removing 80% or more of nitrogen oxides at the SCR inlet temperature of approximately 220° C. or higher.

Example 8

<Ammonia Adsorption Test>

Figure 9:
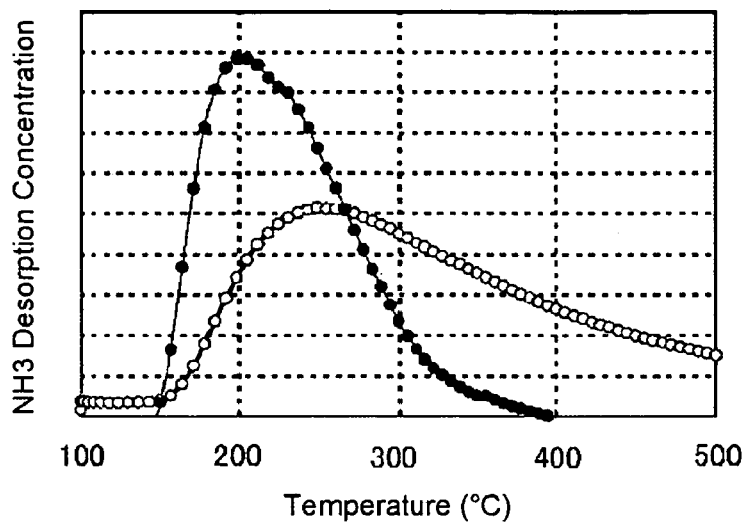
FIG. 9 is a graph of a result of a comparison with the $V_2O_5$—$TiO_2$ based catalyst (black circle) concerning an ammonia adsorption characteristic of the Fe—Si—Al oxide based catalyst (open circle) obtained in the Example 2.

An ammonia desorption spectrum upon temperature rising was measured by the TPD-Mass analysis adopting the Fe—Si—Al oxide based catalyst obtained in the Example 2 or the comparative catalyst ($V_2O_5$—$TiO_2$ based catalyst). The temperature rising rate was set to +10° C./min. The TPD-Mass analysis was conducted in a helium atmosphere at a temperature range of 100° C. to 500° C. The result is shown in FIG. 9. As shown in FIG. 9, the Fe—Si—Al oxide based catalyst (open circle) proved to be capable of holding. more ammonia than the comparative catalyst (black circle) over a range from a low temperature to a high temperature. Thus it is considered that the Fe—Si—Al oxide based catalyst contributes to improving a catalytic activity performance.

Example 9

<Denitrating Reaction Test 3>

Figure 10:
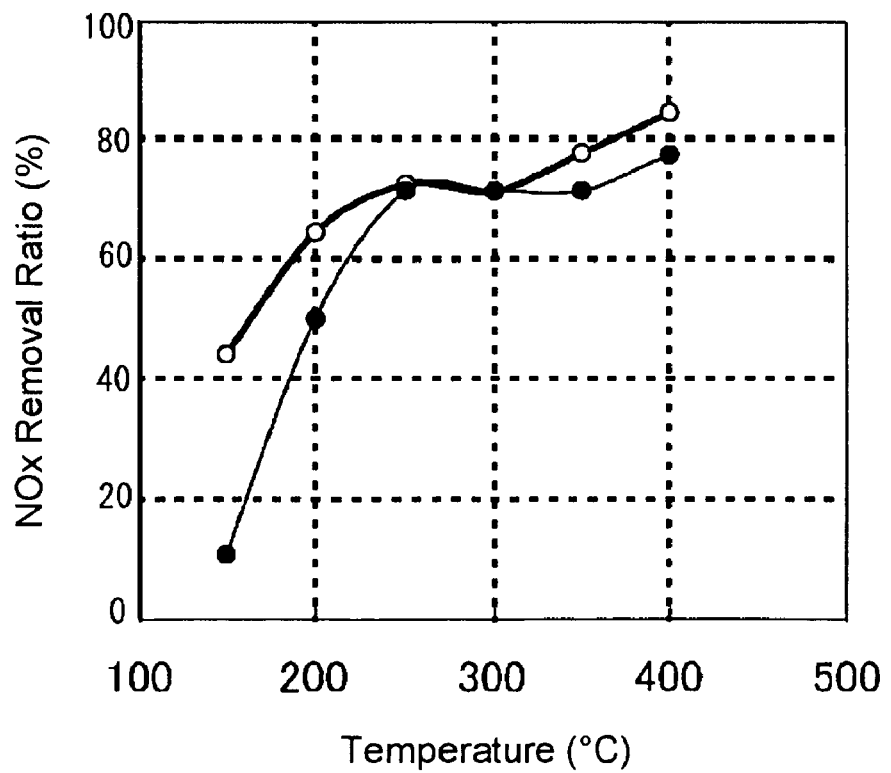
FIG. 10 is a graph of a result of a comparison with the $V_2O_5$—$TiO_2$ based catalyst (black circle) concerning a NOx removal characteristic of the Fe—Si—Al oxide based catalyst (circle) obtained in the Example 2.

A denitrating reaction test was conducted in the same manner as that described in the Example 6, for the Fe—Si—Al oxide based catalyst obtained in the Example 2. The catalyst was evaluated with respect to catalyst inlet temperatures at a range of 150° C. to 400° C. The result is shown in FIG. 10. As shown in FIG. 10, the Fe—Si—Al oxide based catalyst (circle) proved to be capable of removing more nitrogen oxides than the $V_2O_5$—$TiO_2$ based catalyst (black circle).

Example 10

<Denitrating Reaction Test 4>

Figure 11:
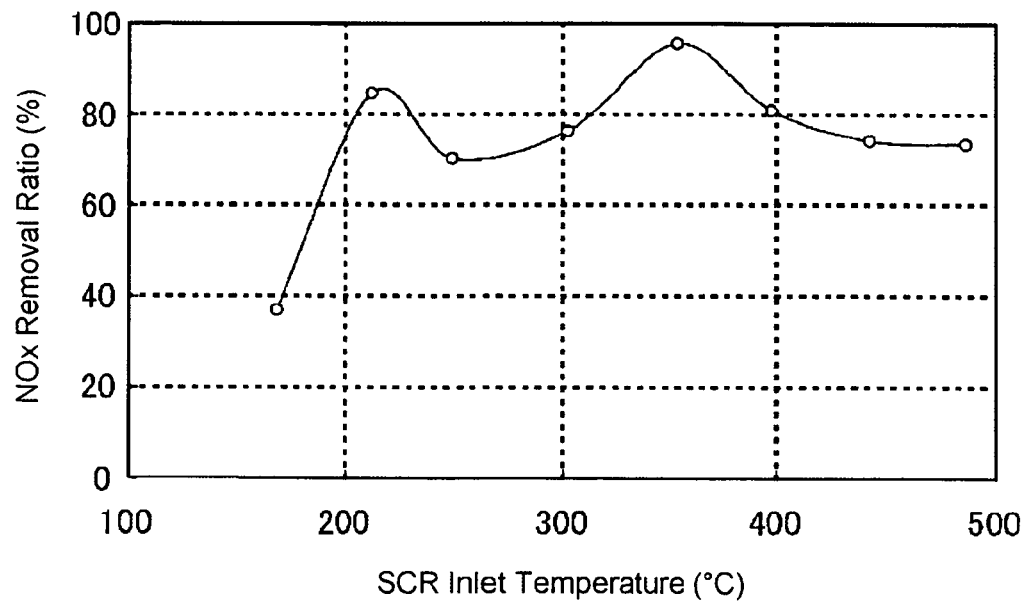
FIG. 11 is a graph of a result of examination of a NOx removal characteristic by an actual device/steady evaluation test adopting the Fe—Si—Al oxide based catalyst obtained in the Example 2.

An actual device/steady evaluation test was conducted in the same manner as that described in the Example 7, except for adoption of the Fe—Si—Al oxide based catalyst in an SCR catalyst size of φ7.5"×7" (5 L). The result is shown in FIG. 11. As shown in FIG. 11, the Fe—Si—Al oxide based catalyst proved to be capable of removing 70% or more of nitrogen oxides at the SCR inlet temperature of approximately 190° C. or higher.

Example 11

<Denitrating Reaction Test 5>

Figure 12:
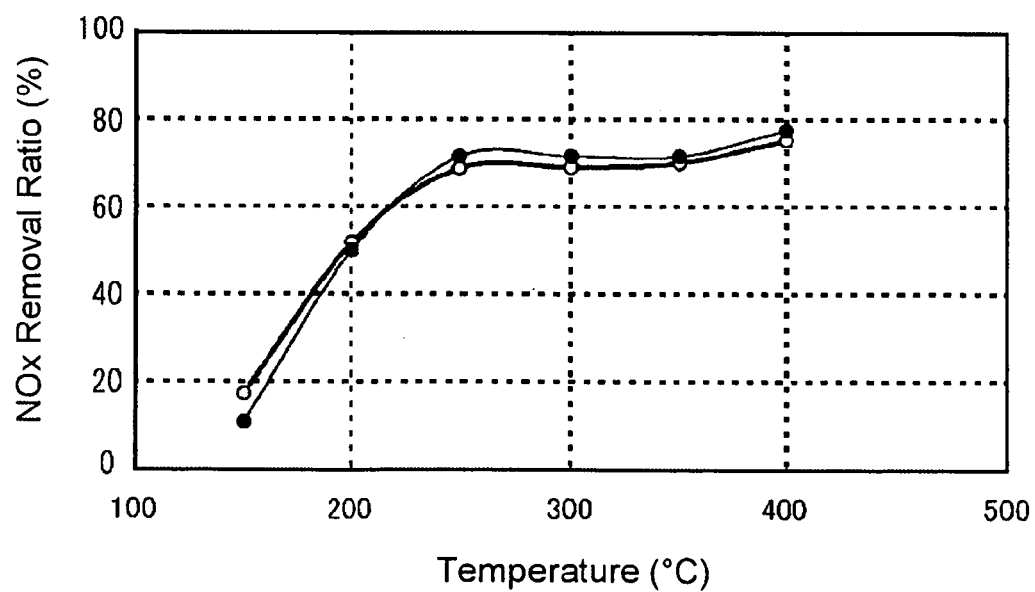
FIG. 12 is a graph of a result of a comparison with the $V_2O_5$—$TiO_2$ based catalyst (black circle) concerning a NOx removal characteristic of the Ce—W—Zr oxide based catalyst (circle) obtained in the Example 3.

A denitrating reaction test was conducted in the same manner as that described in the Example 6, for the Ce—W—Zr oxide based catalyst obtained in the Example 3. The catalyst was evaluated with respect to catalyst inlet temperatures at a range of 150° C. to 400° C. The result is shown in FIG. 12. As shown in FIG. 12, the Ce—W—Zr oxide based catalyst (open circle) proved to be capable of removing nitrogen oxides similarly to the $V_2O_5$—$TiO_2$ based catalyst (black circle)

Example 12

<Denitrating Reaction Test 6>

Figure 13:
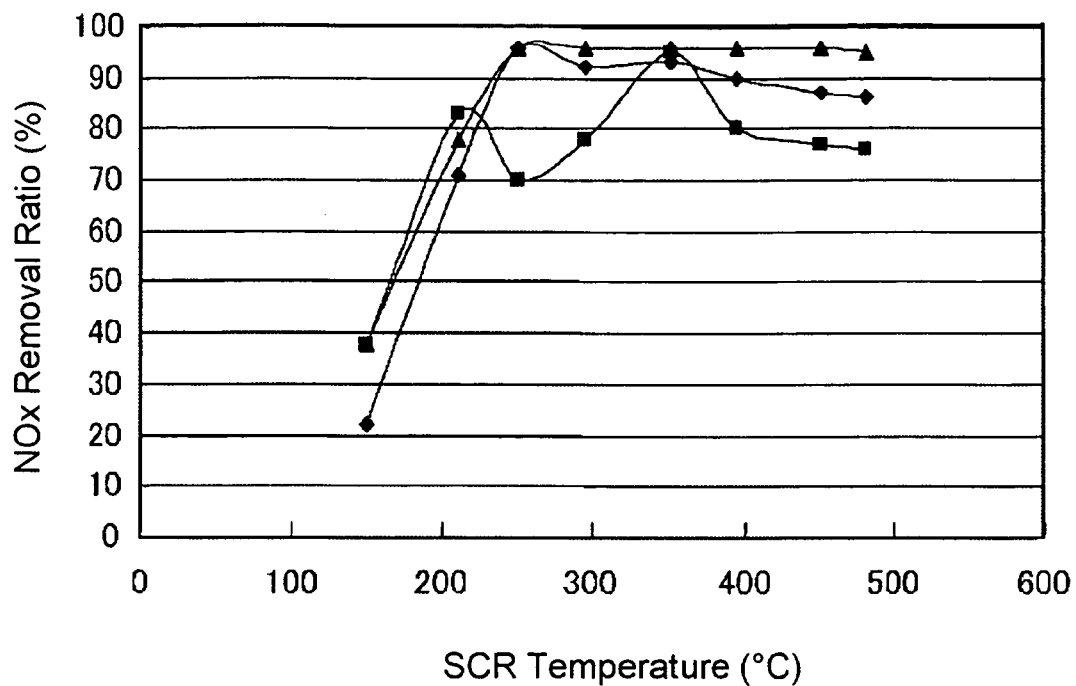
FIG. 13 is a graph of a result of examination of a NOx removal characteristic by an actual device/steady evaluation test in an embodiment of the present invention adopting a mixed catalyst of the Ce—Ti—$SO_4$—Zr based catalyst and Fe—Si—Al oxide based catalyst.

An actual device/steady evaluation test was conducted in the same manner as that described in the Example 7, except for adoption of a mixed catalyst of Ce—Ti—$SO_4$—Zr based catalyst and Fe—Si—Al oxide based catalyst (at a material carriage ratio (Ce—Ti—$SO_4$—Zr based catalyst/Fe—Si—Al oxide based catalyst) of ½) in an SCR catalyst size of φ7.5"× 7" (5 L). The result is shown in FIG. 13. As shown in FIG. 13, the mixed catalyst (triangle) proved to be capable of removing nitrogen oxides more effectively than the cases where the Ce—Ti—$SO_4$—Zr based catalyst (black diamond) or Fe—Si—Al oxide based catalyst (black square) was used alone, at the SCR temperatures of 250° C. or higher. It is considered, therefore, that attacking of high-temperature exhaust gas against the silica-alumina material can be restricted and heat resistance can be improved by making the Ce—Ti—$SO_4$—Zr based catalyst supported on the Fe—Si—Al oxide based catalyst.

Example 13

<Test 1 for Oxidative Decomposition Reaction of Ammonia>

Figure 14:
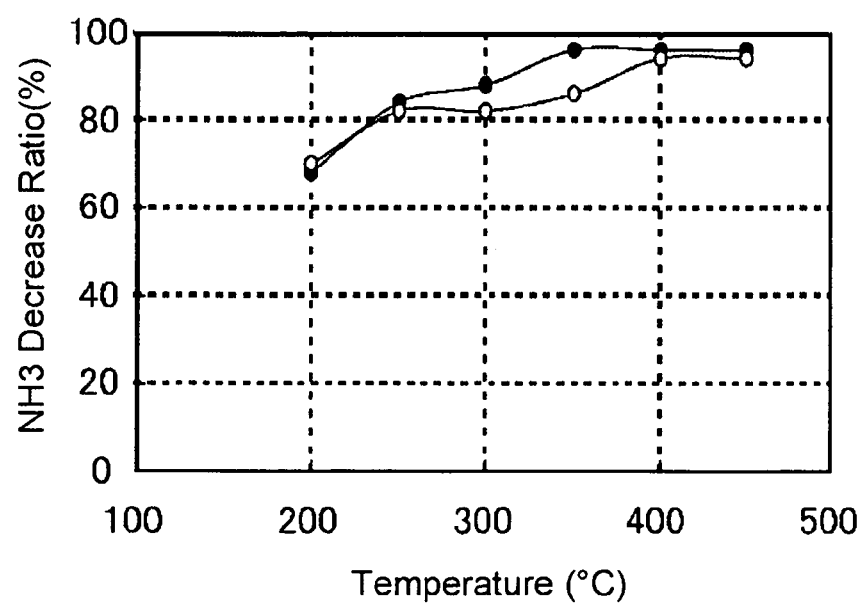
FIG. 14 is a graph of a result of a comparison with a Pt-alumina based catalyst (open circle) concerning an ammonia reduction characteristic of the Pt—Al—Si oxide based catalyst (black circle) obtained in the Example 4.

A test for oxidative decomposition reaction of ammonia was conducted under the following conditions, for the Pt—Al—Si oxide based catalyst obtained in the Example 4. The catalyst was supported on a honeycomb carrier having a diameter of 25 mmφ and a length of 25 mm, and a reaction gas was introduced, which consisted of 500 ppm of $NH_3$, 10% of $O_2$, 5% of $H_2O$, and nitrogen for remainder, under a condition of a space velocity (SV) of 100,000. The catalyst was evaluated with respect to the catalyst inlet temperatures at a range of 200° C. to 450° C. As a comparative example, a Pt-alumina based catalyst (alumina catalyst carrying platinum thereon) was used. The results are shown in FIG. 14. As shown in FIG. 14, the Pt—Al—Si oxide based catalyst (black circle) proved to be capable of removing more ammonia than the Pt-alumina based catalyst (open circle).

Figure 15:
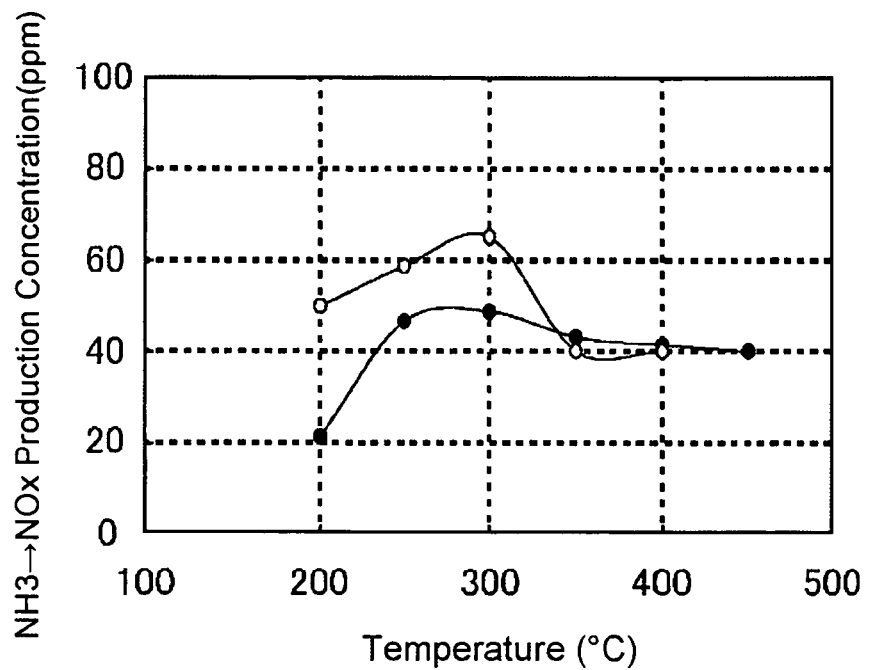
FIG. 15 is a graph of a result of a comparison with the Pt-alumina based catalyst (open circle) concerning an $NH_3 \rightarrow N_2O$ generation characteristic of the Pt—Al—Si oxide based catalyst (black circle) obtained in the Example 4.

Further, a nitrogen oxide generation concentration was examined, and the Pt—Al—Si oxide based catalyst (black circle) proved to be capable of restricting generation of nitrogen oxides more than the Pt-alumina based catalyst (circle) as shown in FIG. 15.

Example 14

<Ammonia Adsorption Test 2>

Figure 16:
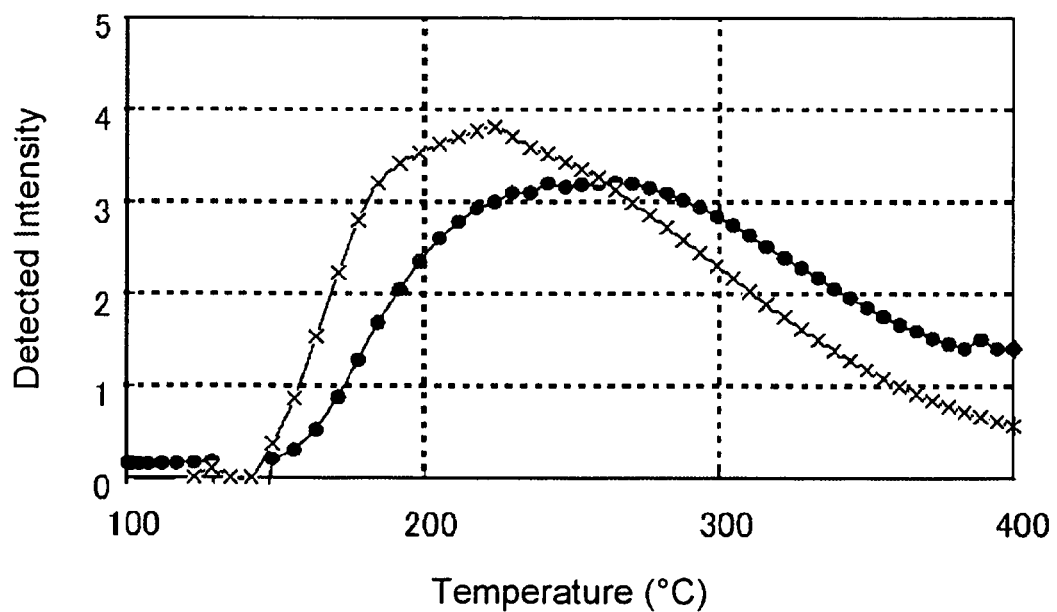
FIG. 16 is a graph of a result of a comparison with the Pt-alumina based catalyst (x-mark) concerning an ammonia adsorption characteristic of the Pt—Al—Si oxide based catalyst (black circle) obtained in the Example 4.

An ammonia desorption spectrum upon temperature rising was measured by the TPD-Mass analysis adopting the Pt—Al—Si oxide based catalyst obtained in the Example 4 or the comparative catalyst (Pt-alumina based catalyst). The temperature rising rate was set to +10° C./min. The TPD-Mass analysis was conducted in a helium atmosphere at a temperature range of 100° C. to 400° C. The result is shown in FIG. 16. As shown in FIG. 16, the Pt—Al—Si oxide based catalyst (black circle) proved to be capable of holding more ammonia than the comparative catalyst (x-mark) over a range from a low temperature to a high temperature. Thus it is considered that the Pt—Al—Si oxide based catalyst contributes to improving a catalytic activity performance.

Example 15

<Test 2 for Oxidative Decomposition Reaction of Ammonia>

10 g of alumina sol and an appropriate amount of water were mixed with 90 g of the Pt—Al—Si oxide based catalyst obtained in the Example 4. The mixture was coated onto a honeycomb carrier substrate, which is made of cordierite (400 cell/inch$^2$), thereby obtaining a honeycomb structural body. Next, 10 g of alumina sol and an appropriate amount of water were mixed with 90 g of a mixed catalyst of the Ce—Ti—$SO_4$—Zr based catalyst obtained in the Example 1 and the Fe—Si—Al oxide based catalyst obtained in the Example 2 (weight ratio of Ce—Ti—$SO_4$—Zr based catalyst to Fe—Si—Al oxide based catalyst was 1:1). The mixture was coated onto the honeycomb structural body, thereby obtaining a honeycomb carrier catalyst.

Figure 17:
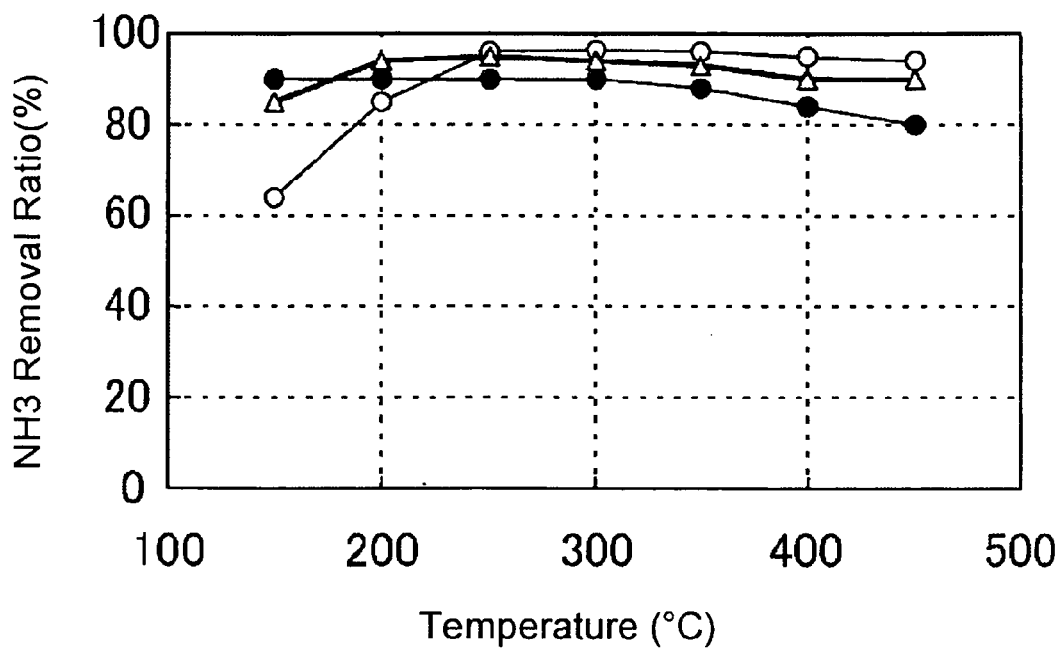
FIG. 17 is a graph of a result of a comparison among a slip-A Fresh (open circle), a slip-B Fresh (black circle), and a slip-C Fresh (triangle), concerning an ammonia removal characteristic, in an embodiment of the present invention.

The honeycomb carrier catalyst (slip-C Fresh; base coat: Pt—Al—Si oxide based catalyst, overcoat: Ce—Ti—$SO_4$—Zr based catalyst and Fe—Si—Al oxide based catalyst), the honeycomb structural body (slip-B Fresh; Pt—Al—Si oxide based catalyst), or a comparative catalyst (slip-A Fresh; provided by carrying a Pt-alumina based catalyst on a honeycomb carrier substrate) was each packed in a reaction tube made of stainless steel having a diameter of 25 mmφ and a length of 12.5 mm, and a reaction gas was introduced, which consisted of 50 ppm of $NH_3$, 10% of $O_2$, 5% of $H_2O$, and nitrogen for remainder, under a condition of a space velocity (SV) of 200,000/h. The catalyst inlet temperatures were estimated within a range of 150° C. to 450° C. Note that the temperature rising rate was set to 5° C./min. The results are shown in FIG. 17. As shown in FIG. 17, it was proven that while the slip-A Fresh (open circle) is merely capable of effectively removing ammonia at temperatures of 250° C. to 450° C., the slip-B Fresh (black circle) and the slip-C Fresh (triangle) are additionally capable of effectively removing ammonia even at low temperatures (from 150° C. to 250° C.).

Figure 18:
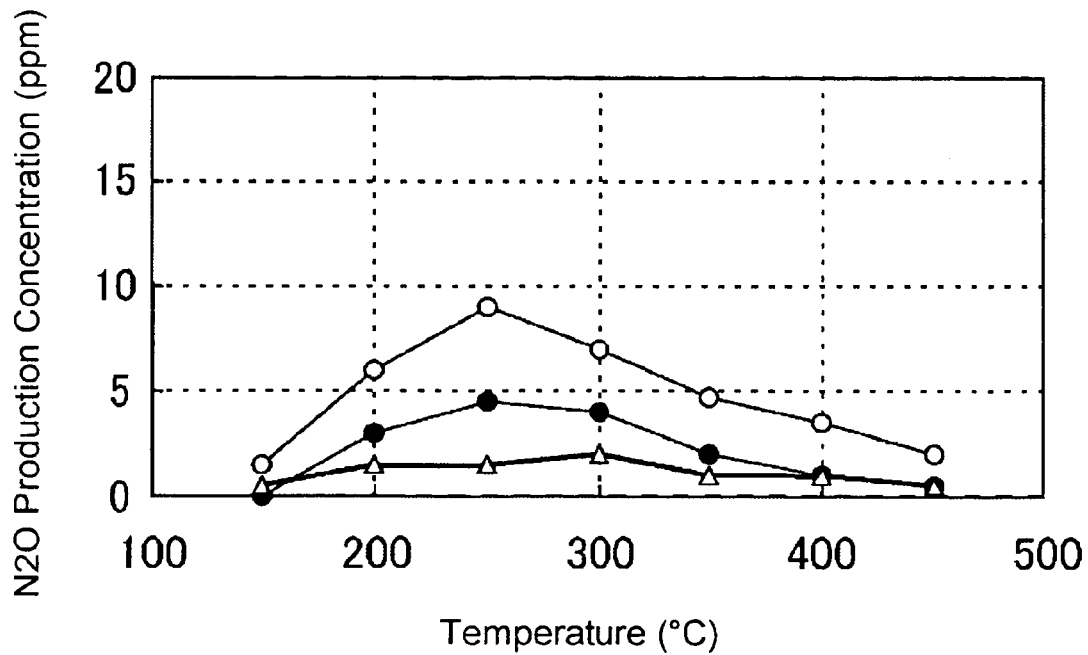
FIG. 18 is a graph of a result of a comparison among the slip-A Fresh (circle), slip-B Fresh (black circle), and slip-C Fresh (triangle), concerning an $N_2O$ generation characteristic, in an embodiment of the present invention.
Figure 19:
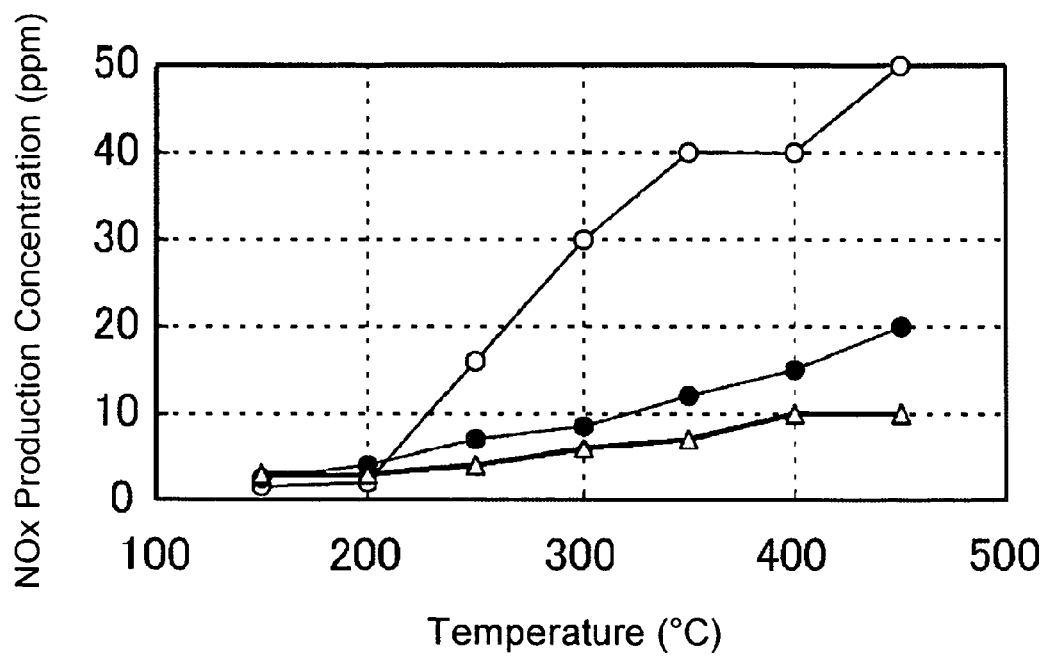
FIG. 19 is a graph of a result of a comparison among the slip-A Fresh (circle), slip-B Fresh (black circle), and slip-C Fresh (triangle), concerning a nitrogen oxide (NOx) generation characteristic, in an embodiment of the present invention.

Then, generation concentrations of $N_2O$ and other nitrogen oxides were examined in the same manner as the above. The results are shown in FIG. 18 and FIG. 19. As shown in FIG. 18 and FIG. 19, the slip-B Fresh (black circle) and slip-C Fresh (triangle) proved to be further capable of restricting generation of $N_2O$ and other nitrogen oxides (NOx) as compared with the slip-A Fresh (open circle).

Based on the above, it is concluded that the slip-B Fresh and slip-C Fresh are catalysts which are not only capable of effectively removing ammonia but also useful for restricting generation of nitrogen oxides such as $N_2O$, over a range from low temperatures to high temperatures (from 150° C. to 450° C.)

Example 16

<Exhaust Gas Removal Performance of TI Catalyst Mounted on 13 L Displacement Engine>

10 g of alumina sol and an appropriate amount of water were mixed with 90 g of a Pt-based catalyst (Pt-alumina catalyst). The mixture was coated onto a honeycomb carrier substrate (made of cordierite; 400 cell/inch$^2$), thereby obtaining a honeycomb structural body. Similarly, 10 g of alumina sol and an appropriate amount of water were mixed with 90 g of a mixture (mixing ratio of 1/1) of the Ce—Ti—SO$_4$—Zr based catalyst and Fe—Si—Al oxide based catalyst, coated onto a honeycomb carrier substrate (made of cordierite; 400 cell/inch$^2$), thereby obtaining another honeycomb structural body.

Figure 20:
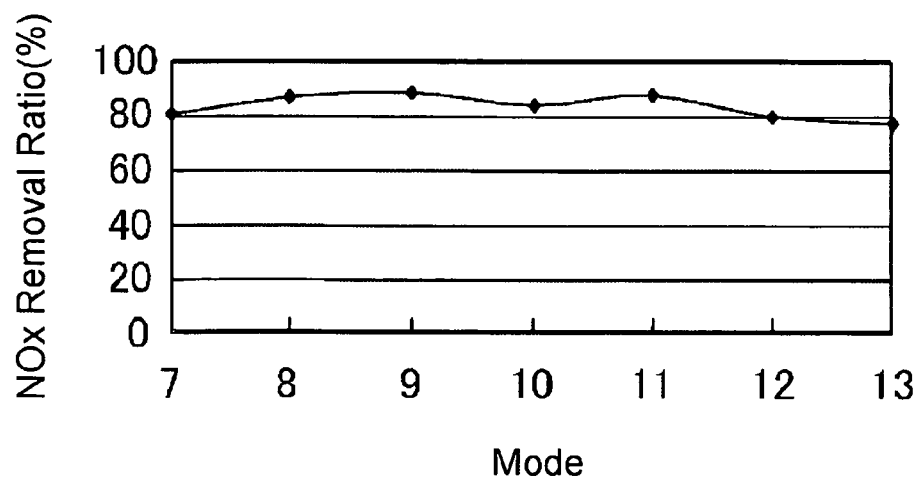
FIG. 20 is a graph of an exhaust gas evaluation result by a simple D13 mode evaluation adopting a catalyst system according to an embodiment of the present invention.

An exhaust gas purification muffler (produced by TOKYO ROKI Co., Ltd.) of an engine having a displacement of 13 L was loaded with: the honeycomb structural body (catalyst volume of 8.5 L, catalyst content of 3.5 g/L) supporting a Pt-based catalyst, on the nitrogen compound oxidizing/treating part 10; the honeycomb structural body (catalyst volume of 8.5 L, catalyst content of 600 g/L) supporting the Ce—Ti—SO$_4$—Zr based catalyst and Fe—Si—Al oxide based catalyst, on the first reaction part 30; and the slip-C Fresh (catalyst volume of 5.7 L, catalyst content of 500 g/L), on the second reaction part 40, and a denitrating reaction test was conducted by addition of urea under a simple D-13 mode (steady running mode) condition. The urea was added such that the molar ratio between ammonia and nitrogen oxides became 1:1 at the first reaction part 30. The result is shown in FIG. 20. As shown in FIG. 20, it was confirmed that nitrogen oxides were effectively removed in any mode (from mode 7 to 17).

Figure 21:
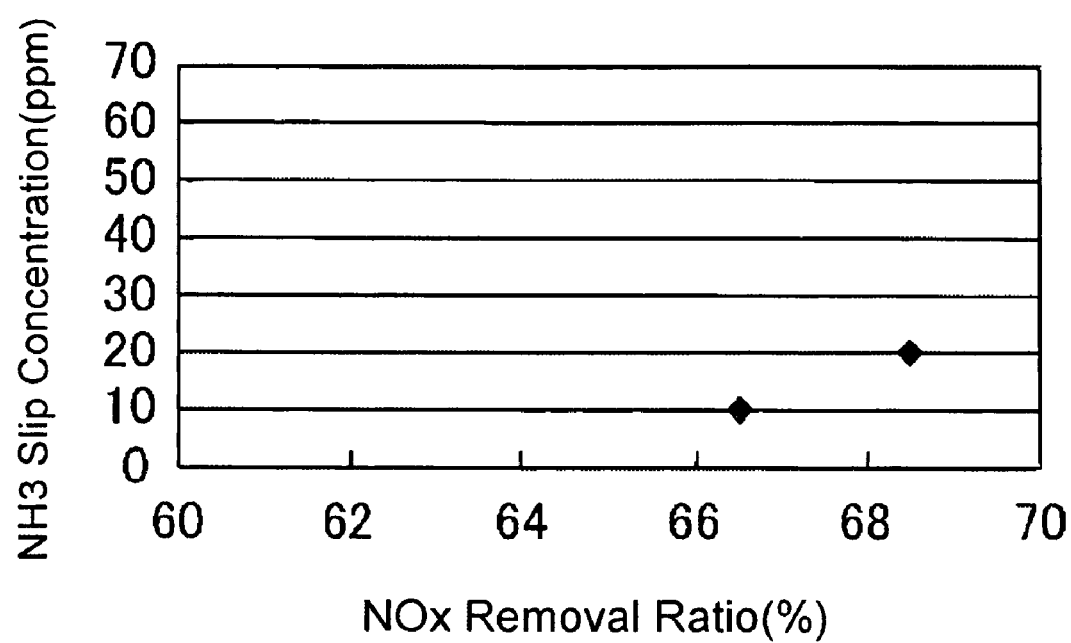
FIG. 21 is a graph of an exhaust gas evaluation result by a JE05 mode evaluation adopting a catalyst system according to an embodiment of the present invention.

Further, a relationship between nitrogen oxides and an ammonia slip concentration under a JE05 mode (transient running mode; representative running mode) was examined by using the above-described exhaust gas purification muffler (black diamond). The urea was added such that the molar ratio between ammonia and nitrogen oxides became 0.75 to 0.8 at the first reaction part 30. The result is shown in FIG. 21. As shown in FIG. 21, it was confirmed that the exhaust gas purification muffler (black diamond) of the present invention is capable of effectively restricting slip of generated ammonia by increasing removal ratio of nitrogen oxides.

INDUSTRIAL APPLICABILITY

According to the present invention, there can be provided a nitrogen oxide removal catalyst system and a nitrogen oxide removal method, each adopting a catalyst which is free of metals that have been suggested harmful and capable of achieving removal of nitrogen oxides efficiently, and another catalyst which is capable of restricting generation of nitrogen oxides and capable of oxidatively decomposing slip ammonia into nitrogen and water effectively.

What is claimed is:

1. A nitrogen oxide removal catalyst system, comprising a first reaction part for denitrating nitrogen oxides by reacting said nitrogen oxide with ammonia, being provided with a first catalyst containing, as active constituents, at least: a complex oxide comprising two or more oxides selected from silica, alumina, titania, zirconia, and tungsten oxide; a rare earth metal or a transition metal (except Cu, Co, Ni, Mn, Cr, and V); and sulfur or phosphorus; and a second reaction part for oxidatively decomposing ammonia that has leaked from the first reaction part, being provided with a second catalyst containing, as active constituents, at least: a noble metal and a silica-alumina type complex oxide.

2. The nitrogen oxide removal catalyst system of claim 1, wherein the first catalyst contains, as active constituents, at least: a titania-zirconia type complex oxide; a rare earth metal or a transition metal (except Cu, Co, Ni, Mn, Cr, and V); and sulfur or phosphorus.

3. The nitrogen oxide removal catalyst system of claim 1, wherein the first catalyst contains, as active constituents, at least: a tungsten oxide-zirconia type complex oxide; a rare earth metal or a transition metal (except Cu, Co, Ni, Mn, Cr, and V); and sulfur or phosphorus.

4. The nitrogen oxide removal catalyst system of claim 1, wherein the first catalyst contains, as active constituents, at least: a silica-alumina type complex oxide and a rare earth metal.

5. The nitrogen oxide removal catalyst system of claim 1, wherein the first catalyst consists of a silica-alumina type complex oxide and a transition metal (except Cu, Go, Ni, Mn, Cr, and V).

6. The nitrogen oxide removal catalyst system of claim 1, wherein a composite containing, as active constituents, at least: an oxide selected from silica, alumina, titania, zirconia, and tungsten oxide; and a rare earth metal or a transition metal (except Cu, Go, Ni, Mn, Cr, and V), is supported by the first catalyst.

7. The nitrogen oxide removal catalyst system of claim 1, wherein a composite containing, as active constituents, at least: an oxide selected from silica, alumina, titania, zirconia, and tungsten oxide; and a rare earth metal or a transition metal (except Cu, Go, Ni, Mn, Cr, and V), is supported by the second catalyst.

8. The nitrogen oxide removal catalyst system of claim 1, wherein said catalyst is supported by a carrier substrate.

9. The nitrogen oxide removal catalyst system of claim 1, further comprising, at an upstream side of the first reaction part, a third reaction part for oxidizing a nitrogen compound by reacting the nitrogen compound with oxygen.

10. A nitrogen oxide removal method comprising denitrating nitrogen oxides reductively by contacting the nitrogen oxides with a first catalyst in the presence of ammonia, the first catalyst containing, as active constituents, at least: a complex oxide comprising two or more oxides selected from silica, alumina, titania, zirconia, and tungsten oxide; and a rare earth metal or transition metal (except Cu, Co, Ni, Mn, Cr, and V); and sulfur or phosphorus; and decomposing unreacted ammonia oxidatively by contacting the untreated ammonia with a second catalyst, the second catalyst containing, as active constituents, at least, a noble metal and a silica-alumina type complex oxide.

* * * * *

UNITED STATES PATENT AND TRADEMARK OFFICE
CERTIFICATE OF CORRECTION

PATENT NO. : 7,597,865 B2  Page 1 of 1
APPLICATION NO. : 10/590776
DATED : October 6, 2009
INVENTOR(S) : Takayuki Mori et al.

It is certified that error appears in the above-identified patent and that said Letters Patent is hereby corrected as shown below:

In claim 5, column 14, line 22, "Go," should read --Co,--.

In claim 6, column 14, line 28, "Go," should read --Co,--.

In claim 7, column 14, line 34, "Go," should read --Co,--.

Signed and Sealed this

Eighth Day of December, 2009

David J. Kappos
*Director of the United States Patent and Trademark Office*